(12) United States Patent
Case et al.

(10) Patent No.: US 12,226,695 B2
(45) Date of Patent: Feb. 18, 2025

(54) VIDEO GAMING COMMUNICATION SYSTEM

(71) Applicant: Ace Bayou Corp., Kenner, LA (US)

(72) Inventors: Gareth Case, Bradford (GB); Robert McNae, Kenner, LA (US)

(73) Assignee: Ace Bayou Corp., Kenner, LA (US)

( * ) Notice: Subject to any disclaimer, the term of this patent is extended or adjusted under 35 U.S.C. 154(b) by 246 days.

(21) Appl. No.: 17/940,781

(22) Filed: Sep. 8, 2022

(65) Prior Publication Data

US 2023/0092272 A1    Mar. 23, 2023

Related U.S. Application Data

(60) Provisional application No. 63/242,531, filed on Sep. 10, 2021.

(51) Int. Cl.
| | | |
|---|---|---|
| *A63F 13/215* | (2014.01) | |
| *A47C 7/72* | (2006.01) | |
| *A47C 15/00* | (2006.01) | |
| *A63F 13/533* | (2014.01) | |
| *A63F 13/54* | (2014.01) | |
| *G06F 3/16* | (2006.01) | |
| *H04R 1/10* | (2006.01) | |
| *H04R 5/033* | (2006.01) | |

(52) U.S. Cl.
CPC .............. *A63F 13/54* (2014.09); *A47C 7/727* (2018.08); *A47C 15/004* (2013.01); *A63F 13/215* (2014.09); *A63F 13/533* (2014.09); *G06F 3/165* (2013.01); *H04R 1/1083* (2013.01); *H04R 5/033* (2013.01)

(58) Field of Classification Search
CPC ........ A63F 13/215; A63F 13/22; A63F 13/23; A63F 13/25; A63F 13/28; A63F 13/424; A63F 13/533; A63F 13/54; A63F 13/90; G06F 3/165; A47C 7/723; A47C 7/745; A47C 7/727; A47C 15/004
See application file for complete search history.

(56) References Cited

U.S. PATENT DOCUMENTS

| | | | |
|---|---|---|---|
| 6,928,329 B1 | 8/2005 | Giaimo | |
| 8,811,629 B1 | 8/2014 | Kulavik | |
| 2008/0111408 A1* | 5/2008 | Duran | A47C 7/727 297/217.3 |

(Continued)

OTHER PUBLICATIONS

International Search Report and Written Opinion Received for PCT/US2022/42926 on Dec. 22, 2022, 8 pgs.

*Primary Examiner* — Omkar A Deodhar
(74) *Attorney, Agent, or Firm* — Spencer Fane, LLP

(57) ABSTRACT

A method of using video gaming communication system. A gaming chair is provided that includes a control panel and a speaker operably connected to the control panel. A headphone is provided that includes a speaker and a microphone. The headphone is operably connected to the control panel. The control panel is operably connected to a gaming system. A video game sound is transmitted from the gaming system to the control panel. The video game sound is emitted from the gaming chair speaker and the headphone speaker. An audio input is received from the headphone microphone. In response to receiving the audio input, the emitting of the video game sound from at least one of the gaming chair speaker and the headphone speaker is changed.

11 Claims, 2 Drawing Sheets

(56) References Cited

U.S. PATENT DOCUMENTS

2010/0040240 A1    2/2010   Bonanno
2012/0014553 A1*   1/2012   Bonanno ................ H04S 7/306
                                                                              381/364

\* cited by examiner

VIDEO GAMING COMMUNICATION SYSTEM

REFERENCE TO RELATED APPLICATION

This application claims priority to Provisional Applic. No. 63/242,531, filed on Sep. 10, 2021, the contents of which are incorporated herein by reference.

FIELD OF THE INVENTION

The invention relates generally to communication systems. More particularly, the invention relates to a video gaming communication system.

BACKGROUND OF THE INVENTION

Playing video games is a popular recreational activity. Gaming chairs are frequently used while playing video games because the gaming chairs enable the person to not only sit in comfort while playing the video games but also enables the person to move while playing the video games.

The gaming chairs are frequently connected to the gaming system. Such connection enables sounds associated with the video game being played to be emitted from speakers on the gaming chair. To further enhance the person's experience while playing video games when sitting on the gaming chair, the gaming chairs may emit vibrations at certain times while the video game is being played.

SUMMARY OF THE INVENTION

An embodiment of the invention is directed to a method of using video gaming communication system. A gaming chair is provided that includes a control panel and a speaker operably connected to the control panel. A headphone is provided that includes a speaker and a microphone. The headphone is operably connected to the control panel. The control panel is operably connected to a gaming system. A video game sound is transmitted from the gaming system to the control panel. The video game sound is emitted from the gaming chair speaker and the headphone speaker. An audio input is received from the headphone microphone. In response to receiving the audio input, the emitting of the video game sound from at least one of the gaming chair speaker and the headphone speaker is changed.

Another embodiment of the invention is directed to a method of using video gaming communication system. A gaming chair is provided that includes a control panel and a speaker operably connected to the control panel. A headphone is provided that includes a speaker and a microphone. The headphone is operably connected to the control panel. The control panel is operably connected to a gaming system. A video game sound is transmitted from the gaming system to the control panel. The video game sound is emitted from the gaming chair speaker and the headphone speaker. An audio input is received from the headphone microphone. The audio input includes communication with at least one of a person playing the video game or a person who is not playing the video game. In response to receiving the audio input, the emitting of the video game sound from the headphone speaker is discontinued.

Another embodiment of the invention is directed to a video gaming communication system that includes a gaming chair and a headphone. The gaming chair includes a control panel and a speaker operably connected to the control panel. The headphone includes a speaker and a microphone. The headphone is operably connected to the control panel. The control panel is operably connected to a gaming system. In response a video game sound being transmitted from the gaming system to the control panel, the video game sound is emitted from the gaming chair speaker and the headphone speaker. In response to receiving an audio input from the headphone microphone, the emitting of the video game sound from at least one of the gaming chair speaker and the headphone speaker is changed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
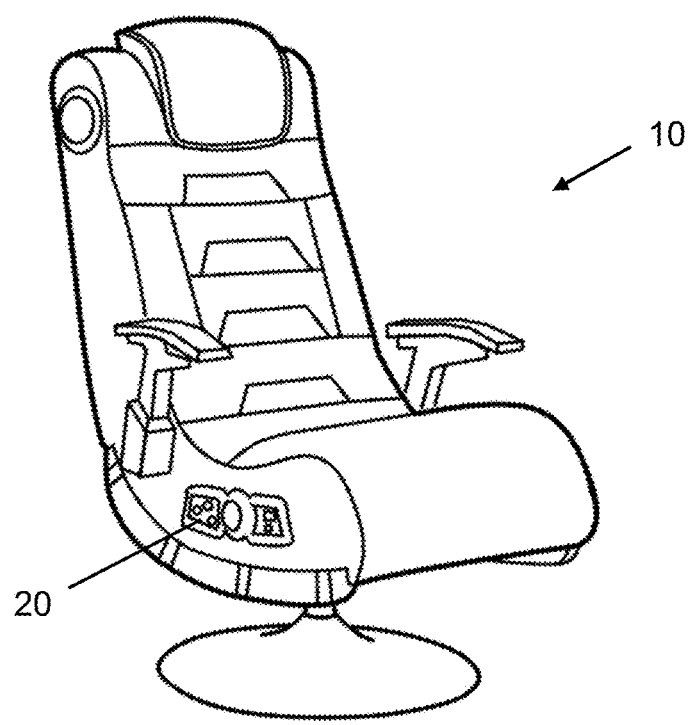
FIG. 1 is a gaming chair utilized in conjunction with an embodiment of the video gaming communication system.

A video gaming communication system is utilized in conjunction with a gaming chair such as illustrated at 10 in FIG. 1. In addition to including components such as a seat portion, a back portion, a base and arm rests, the gaming chair 10 includes a control panel 20.

In certain embodiments, the control panel 20 is mounted on a side surface of the seat portion so that the control panel 20 can be readily accessed by a person sitting on the gaming chair 10 while not otherwise interfering with the use of the gaming chair 10 while playing video games.

Figure 2:
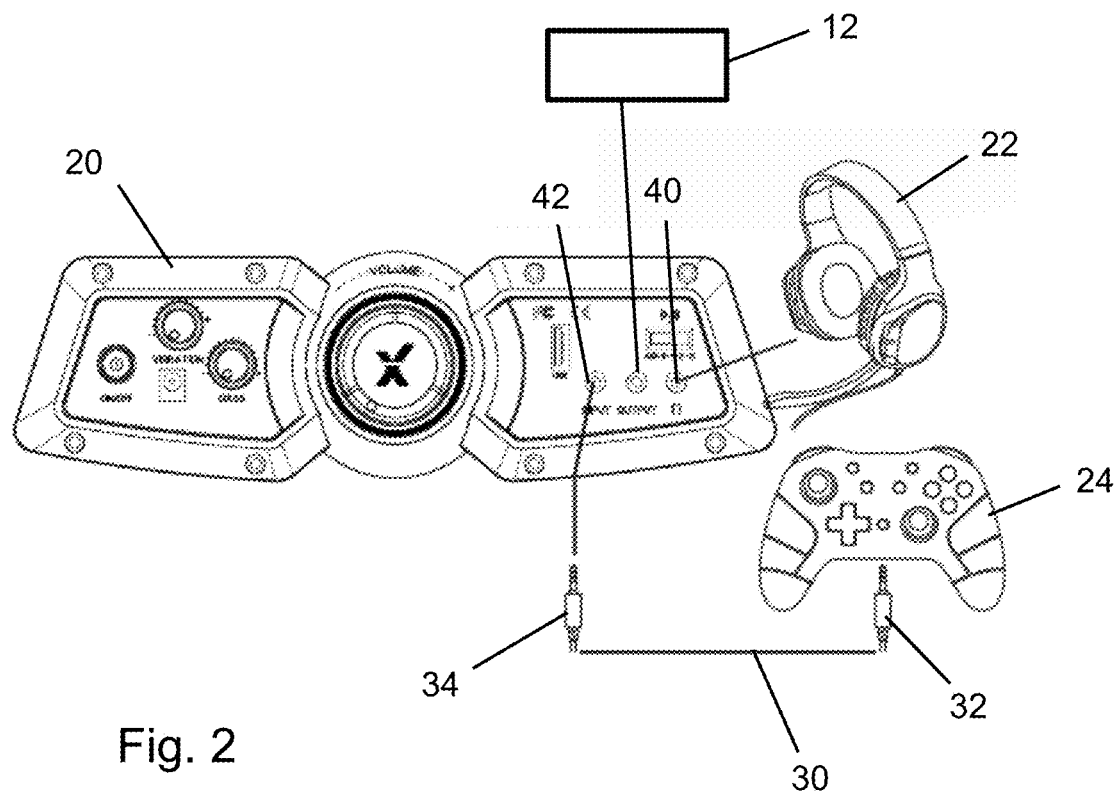
FIG. 2 is a video gaming communication system according to an embodiment of the invention.

The control panel 20 that facilitates connection of the gaming chair 10 to the gaming system 12 and components used in conjunction with the gaming system such as headphones 22 and a gaming controller 24, which are illustrated in FIG. 2.

The control panel 20 may include a variety of components relating to the operation of the gaming chair 10. Examples of these components include a power switch, a volume control, a bass control and a vibration control.

The control panel 20 also includes a headphone port 40 that for operably connecting the headphones 22 to the gaming chair 10 and an input port 42 for operably connecting the gaming controller 24 to the gaming chair 10.

The gaming controller 24 is connected to the input port 42 using an accessory cable 30 having a first communications plug 32 and a second communications plug 34 at opposite ends thereof.

The headphone port 40 has a shape and a size that are similar to a shape and a size of a plug attached to a cable that extends from the headphones 22 so that a portion of the headphone plug can be received in the headphone port 40 and once the headphone plug is inserted into the headphone port 40, the headphone plug resists separation from the headphone port 40.

The gaming controller 24 includes a port with a shape and a size that are similar to a shape and a size of the first communications plug 32 so that a portion of the first communications plug 32 can be received in the gaming controller port and once the first communications plug 32 is inserted into the gaming controller port, the first communications plug 32 resists separation from the gaming controller port.

The input port 42 has a shape and a size that are similar to a shape and a size of the second communications plug 34 so that a portion of the second communications plug 32 can be received in the input port 42 and once the second communications plug 34 is inserted into the input port 42, the second communications plug 34 resists separation from the input port 42.

Figure 3:
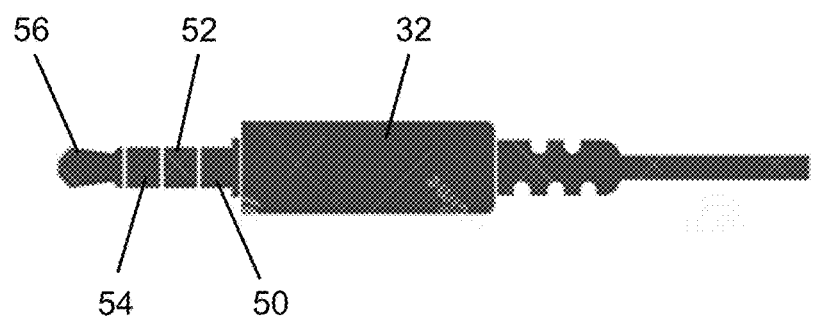
FIG. 3 is a side view of a communications plug for use in conjunction with the video gaming communication system.

The first communications plug 32 includes a tip with four conductive sections as illustrated in FIG. 3. In certain embodiments, the first tip section 50 is for the microphone, the second tip section 52 is for ground, the third tip section 54 is for the left headphone speaker and the fourth tip section 56 is for the right headphone speaker.

In one such configuration, the first communications plug 32 is a 4-pin CTIA compliant plug. The headphone plug and the second communications plug 34 may be configured similar to the first communications plug 32. A person of skill in the art will appreciate that the headphone plug, the first communications plug 32 and the second communications plug 34 may have a variety of other configurations using the concepts of the invention. An example of one suitable alternative configuration is a universal serial bus ("USB") connection.

Figure 4:
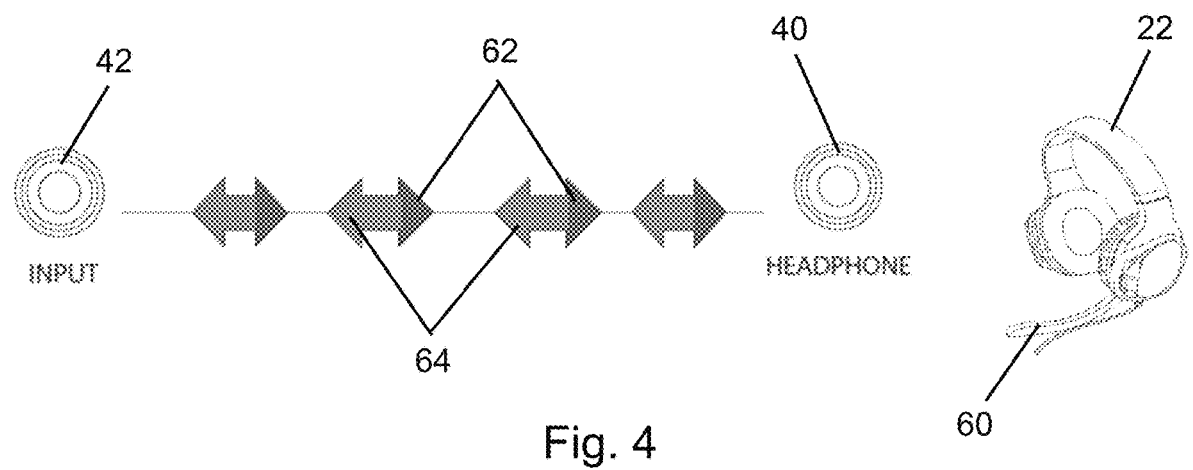
FIG. 4 is a schematic view of use of the video gaming communication system of this invention.

Using the preceding interconnection of components in the video gaming communication system enables sounds associated with the video game being played to be received into the control panel 20 through attachment of the gaming controller 24 to the input port 42 using the accessory cable 30 and then transmitted to the headphones 22 through the headphone port 40 as illustrated by the right directed arrows 62 in FIG. 4.

The invention also enables audio input from a microphone 60 that is associated with the headphones 22 to be received into the control panel 20 through attachment of the headphones 22 to the headphone port 40 and then transmitted to the gaming system using the gaming controller 24 through the input port 42 as illustrated by the left directed arrows 64 in FIG. 4.

It is also possible for the headphones 22 to be connected to a computer such that the person sitting on the gaming chair 10 and playing the video games can communicate (talk and listen) to person(s) who are playing the same video game. Alternatively, the person sitting on the gaming chair 10 can communicate with person(s) other than the person(s) who are playing the same video game.

In such a situation, sounds relating to the video game being played may be emitted from the speakers on the gaming chair 10 instead of speakers in the headphones 22. It is also possible for the sounds relating to the video game being played to be emitted from the speakers in the headphones 22.

In such situations, the sounds relating to the video game being played may be emitted at a lower level so that the person playing the video game can hear what is being said by the person with whom the person playing the video game is talking.

Through the use of the video gaming communication system, the person playing the video game does not have to choose between hearing sounds relating to the video game being played while also hearing sounds from the person with which the person playing the video games is communicating.

There are a variety of mechanisms through which the communications may be routed between the person sitting in the gaming chair 10 and the other person. In one configuration, the communications is routed through the gaming system 12 such as by passing from the headphones 22 to the control panel 20, from the control panel 20 to the gaming controller 24 and then from the gaming controller 24 to the gaming system 12.

In still other embodiments, the communications may be routed through a computer, portable communication device or a phone system that is separate from the gaming system or computer 12 that is being used to play the video game.

A person of skill in the art will appreciate that the video games may also be played using a computer having functionality that is similar to the gaming system 12. As such, the structure identified with reference number 12 is intended to be construed sufficiently broad to encompass gaming systems and computers.

A person of skill in the art will appreciate that these communications may be between two persons or may be between larger groups or people.

To enhance the ability of the person playing the video game system while sitting in the gaming chair 10 to distinguish between sounds relating to the video game and sounds relating to the communication, the control panel 20 may cause a tone to be emitted when switching between the sounds relating to the video game and sounds relating to the communication.

The tone that is emitted when switching from the sounds relating to the video game to the sounds relating to the communication may be different from the tone that is emitted when switching from the sounds relating to the communication to the sounds relating to the video game.

At proximate to the time that the sounds relating to the video game are switched from being emitted by the speakers in the headphones 22 to the speakers in the gaming chair 10, the control panel 20 may cause a notification to be played using at least one of the speakers in the headphones 22 and the speakers in the gaming chair 10 so that the person playing the video game while sitting in the gaming chair 10 is aware of the change. In certain embodiments, the notification indicates "video game sounds are only being emitted through the gaming chair speakers."

Similarly, at proximate to the time that the sounds relating to the video game are switched from being emitted by the speakers in the gaming chair 10 to the speakers in the headphone 22, the control panel 20 may cause a notification to be played using at least one of the speakers in the headphones 22 and the speakers in the gaming chair 10 so that the person playing the video game while sitting in the gaming chair 10 is aware of the change. In certain embodiments, the notification indicates "video game sounds are being emitted through the headphone speakers and the gaming chair speakers."

To enhance the ability of the person playing the video game system while sitting in the gaming chair 10 to hear sounds relating to the video game that are emitted from speakers in the gaming chair 10, the control panel 20 may turn off and/or reduce intensity of noise cancelling of the headphones 22.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method of using video gaming communication system comprising:
   providing a gaming chair comprising a control panel and a speaker operably connected to the control panel;
   providing a headphone comprising a speaker and a microphone;
   operably connecting the headphone to the control panel;
   operably connecting the control panel to a gaming system;
   transmitting a video game sound from the gaming system to the control panel;
   emitting the video game sound from the gaming chair speaker and the headphone speaker;
   receiving an audio input from the headphone microphone;
   in response to receiving the audio input, changing the emitting of the video game sound from at least one of the gaming chair speaker and the headphone speaker, wherein the audio input comprises communication with at least one of a person playing the video game or a person who is not playing the video game; and
   emitting a notification from at least one of the gaming chair speaker and the headphone speaker in response to receiving the audio input, wherein the notification is a sound, wherein the sound is different when the emitting of the video game sounds is switched from the gaming chair speaker to the headphone speaker than when the emitting of the video game sounds is switched from the headphone speaker to the gaming chair speaker.

2. The method of claim 1, wherein in response to receiving the audio input, discontinuing the emitting of the video game sound from the headphone speaker.

3. The method of claim 1, wherein in response to receiving the audio input, decreasing a volume of the emitting of the video game sound from at least one of the headphone speaker and the gaming chair speaker such that the video game sound is less than an audio output from the headphone speaker.

4. The method of claim 1, wherein the notification comprises at least one word.

5. The method of claim 1, wherein the headphone is operably connected to the control panel using at least one of a wired connection and a wireless connection.

6. The method of claim 1, and further comprising transmitting the audio input to the gaming system through a gaming controller.

7. A method of using video gaming communication system comprising:
   providing a gaming chair comprising a control panel and a speaker operably connected to the control panel;
   providing a headphone comprising a speaker and a microphone;
   operably connecting the headphone to the control panel;
   operably connecting the control panel to a gaming system;
   transmitting a video game sound from the gaming system to the control panel;
   emitting the video game sound from the gaming chair speaker and the headphone speaker;
   receiving an audio input from the headphone microphone, wherein the audio input comprises communication with at least one of a person playing the video game or a person who is not playing the video game;
   in response to receiving the audio input, changing the emitting of the video game sound from at least one of the gaming chair speaker and the headphone speaker;
   providing the headphone with noise cancelling; and
   changing an activation of the noise cancelling in response to receiving the audio input.

8. A method of using video gaming communication system comprising:
   providing a gaming chair comprising a control panel and a speaker operably connected to the control panel;
   providing a headphone comprising a speaker and a microphone;
   operably connecting the headphone to the control panel;
   operably connecting the control panel to a gaming system;
   transmitting a video game sound from the gaming system to the control panel;
   emitting the video game sound from the gaming chair speaker and the headphone speaker;
   receiving an audio input from the headphone microphone, wherein the audio input comprises communication with at least one of a person playing the video game or a person who is not playing the video game;
   in response to receiving the audio input, the emitting of the video game sound from the headphone speaker is discontinued; and
   emitting a notification from at least one of the gaming chair speaker and the headphone speaker in response to receiving the audio input, wherein the notification comprises at least one word, wherein the sound is different when the emitting of the video game sounds is switched from the gaming chair speaker to the headphone speaker than when the emitting of the video game sounds is switched from the headphone speaker to the gaming chair speaker.

9. The method of claim 8, wherein in response to receiving the audio input, decreased a volume of the emitting of the video game sound from the gaming chair speaker.

10. The method of claim 8, wherein the headphone is operably connected to the control panel using at least one of a wired connection and a wireless connection.

11. The method of claim 8, and further comprising transmitting the audio input to the gaming system through the gaming controller.

* * * * *